R. T. BURDETTE.
RATCHET PAWL RELEASING MECHANISM.
APPLICATION FILED DEC. 10, 1909.
981,162.
Patented Jan. 10, 1911.
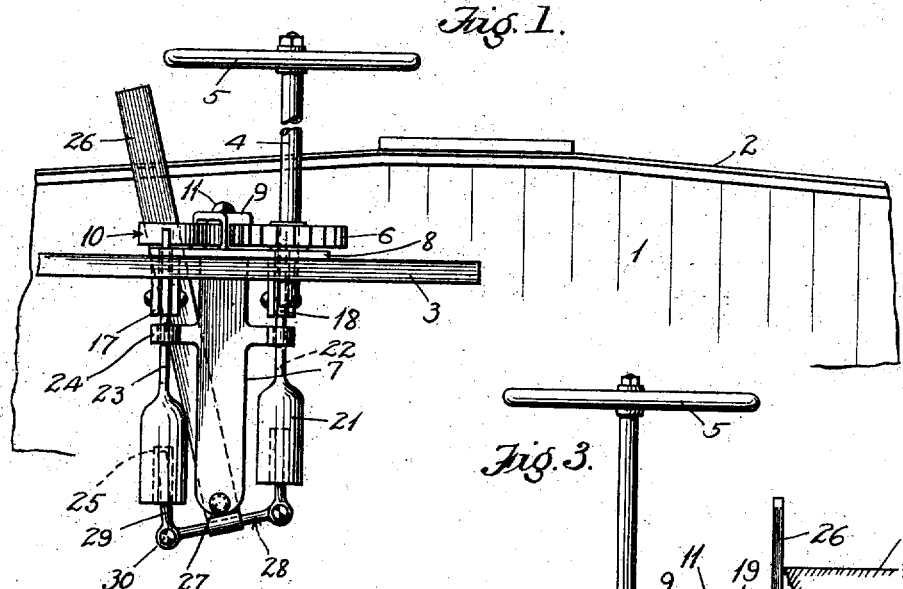
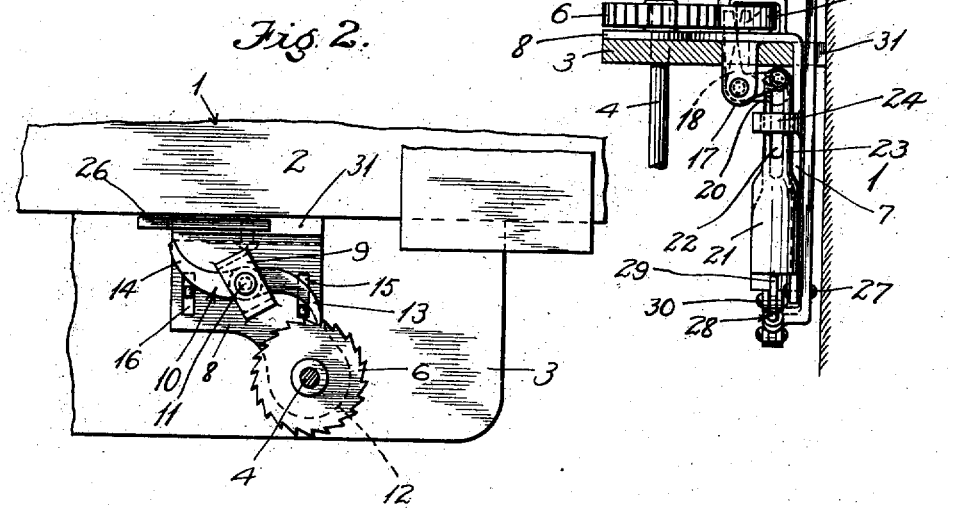
Witnesses.
Inventor.
Robert T. Burdette.
Attorneys.

UNITED STATES PATENT OFFICE.

ROBERT T. BURDETTE, OF LOS ANGELES, CALIFORNIA.

RATCHET-PAWL-RELEASING MECHANISM.

981,162.   Specification of Letters Patent.   Patented Jan. 10, 1911.

Application filed December 10, 1909. Serial No. 532,327.

*To all whom it may concern:*

Be it known that I, ROBERT T. BURDETTE, a citizen of the United States, residing at Los Angeles, in the county of Los Angeles and State of California, have invented new and useful Improvements in Ratchet-Pawl-Releasing Mechanisms, of which the following is a specification.

This invention relates to a ratchet releasing device, the purpose of which is to facilitate the releasing of a ratchet wheel from its coöperating pawl.

While the invention is capable of being used in many mechanisms where a ratchet and pawl are employed, it is particularly useful when embodied with a hand brake controlling mechanism for railway cars.

As hand brakes of cars are usually constructed they embody a hand wheel operating a spindle carrying a ratchet wheel, and a pawl is arranged to coöperate with the ratchet wheel to hold the brake applied. In releasing a brake of that kind, the brakeman must apply a rotative force to the hand wheel, and then while this force is applied, disengage the pawl with his foot. To release a brake in this way on a moving train subjects the brakeman to considerable risk, and much loss of life occurs on railway systems incidentally to the operation of the hand brakes of that construction. When constructed according to my invention, the pawl controlling devices may be set ready to act before the hand wheel is touched. It is then simply necessary to rotate the hand wheel in order to release the brake. In this way I make it unnecessary for the brakeman to use his foot to throw out the pawl while his body is in the strained condition incident to rotating the hand wheel.

The invention consists in the construction and combination of parts to be more fully described hereinafter and particularly set forth in the claims.

In the annexed drawing which fully illustrates my invention, Figure 1 is an elevation showing the upper portion of the end of a box car to which my invention has been applied. Fig. 2 is a plan showing the mechanism illustrated in Fig. 1. Fig. 3 is a view showing the mechanism in side elevation, that is, looking across the end of the car.

Referring more particularly to the drawing, 1 represents the end of a box car which is provided near the roof 2 with a foot shelf or ratchet shelf 3. Through this shelf a brake spindle 4 extends downwardly, the upper end of the spindle being provided with a hand wheel 5 enabling it to be rotated from the roof of the car.

In applying my invention I provide the spindle 4 with a ratchet wheel 6 of usual construction and I provide a bracket 7, the upper portion of which is formed into a horizontal plate 8, which rests upon the upper side of the shelf 3. On the upper side of this plate 8 an upwardly extending integral yoke 9 is formed through which passes a pawl 10. This pawl is pivotally mounted in the yoke by means of a pivot bolt 11 which passes downwardly through the yoke and through the plate 8 as will be readily understood. As indicated in Fig. 2, the plate 8 is formed with an extension or ear 12 which forms a bearing for the spindle 4. The pawl 10 is formed with a curved body 13, the point of which is adapted to engage the teeth of the ratchet wheel 6 as indicated in Fig. 2, and beyond the pivot bolt 11 the pawl is formed into a curved tail 14. The bracket plate 8 is provided with slots 15 and 16, the former of which is disposed under the body 13 of the pawl so that when the pawl swings into engagement or out of engagement with the ratchet wheel, it moves over this slot. In a similar manner when the pawl swings, its tail 14 moves over the slot 16.

The bracket 7 on the under side of the plate 8 is provided with downwardly projecting ears 17 between which pawl shifters 18 are pivotally mounted. These pawl shifters are in the form of crank levers as indicated most clearly in Fig. 3. Each crank lever has an upwardly extending arm or finger 19 which passes up through one of the slots 15 or 16 so as to strike the edge of the pawl. And each crank lever further has a horizontal short arm 20 which forms a pin and slot connection with a weight 21. From this arrangement it should be understood that there are two weights provided, each weight having a vertically elongated slot 22 in its upper end. This portion of each weight is formed into a reduced neck 23 which passes through a guide lug 24 projecting outwardly from the bracket 7. The lower ends of the weights 21 are provided with chambers 25 respectively which extend upwardly from the lower faces of the weights as indicated most clearly in Fig. 1.

The body of the bracket 7 extends downwardly as shown and at or near its lower end a shifting lever 26 is mounted on a pivot pin 27. Adjacent to the pivot pin the end of the lever is provided with a fixed cross head 28 and to the ends of this cross head 28 short stems 29 are attached by pivot pins 30 as indicated. These stems 29 extend upwardly into the chambers 25 so that the upper ends of the stems are adapted to engage the upper ends of the chambers 25 in such a way as to enable the lever 26 to raise either of the weights. It should be noted that the stems 29 fit quite loosely in the chambers 25 so as to permit the stems to move readily in and out in spite of the arcuate or curved path of the pivot pins 30. Referring to Fig. 3 it will be seen that the lever 26 lies adjacent to the end of the car and it passes upwardly through a suitable slot 31 formed in the inner edge of the ratchet shelf 3 as shown.

The mode of operation of the mechanism will now be described.

As illustrated in Fig. 1, the lever 26 is disposed to the left of its mid position. When in this position the right hand weight 21 is elevated and the weight 21 at the left is depressed. In this way the weight is applied to the left hand pawl shifter 18, but it is not applied to the right hand pawl shifter. From inspection of Fig. 2 it will be evident that the weight applied on the left hand pawl shifter tends to move the tail 14 of the pawl toward the car through the action of the upwardly extending arm 19 of the pawl shifter. This tends to hold the point of the pawl in engagement with the ratchet wheel so that when the hand wheel 5 is rotated, the pawl will "run on the ratchet wheel" and hold the ratchet wheel against return when the brake is being applied. When it is desired to release the pawl so as to release the brake, the lever will be moved over to the right and the hand wheel 5 is seized and rotated slightly in a forward direction so as to "ease" the pawl. Moving the lever over in this way raises the left hand weight and permits the right hand weight to descend to the limit of its downward movement permitted by the slot 22. This suspends the right hand weight on the right hand pawl shifter, and this pawl shifter will throw the pawl out of engagement with the ratchet wheel as soon as it is eased as will be readily understood. In this way the ratchet wheel becomes released from the pawl and the brakes will return to the "off" position. As soon as the brakes are completely released the lever 26 will be moved back to its normal position at the left, which returns the pawl to its normal cooperative relation with the ratchet wheel. In adjusting the length of the stems 29 to the chambers 25 it should be noted that there should be a little play between the end of the left hand stem when depressed and the end of its corresponding bore. This insures that the weight will be fully applied to the pawl shifter and permits the short rise and fall of the weight which will take place while the pawl is running on the ratchet. It should be understood that the lever 26 more than counter-balances the weight of either of the weights so that the lever tends to stay in either of its extreme positions.

Having fully described my invention, what I claim as new and desire to secure by Letters Patent, is:

1. In mechanism of the class described, in combination, a ratchet wheel, means for rotating the same, a pawl coöperating with said ratchet wheel, pawl actuating means tending to throw said pawl into engagement with said ratchet wheel, a second pawl actuating means tending to throw said pawl out of engagement with said ratchet wheel and a freely movable member adapted by its own weight to overbalance either of said pawl actuating means and render the same inoperative.

2. In mechanism of the class described, in combination, a ratchet wheel, a pawl coöperating therewith, a weight normally applied on said pawl and tending to hold said pawl in engagement with said ratchet wheel, a second weight normally unapplied to said pawl and adapted to throw said pawl out of engagement with said ratchet wheel, and means for applying either of said weights to said pawl.

3. In mechanism of the class described, in combination, a ratchet wheel, a pawl coöperating therewith, a pawl shifter adapted to move said pawl toward said ratchet wheel, a second pawl shifter adapted to move said pawl away from said ratchet wheel, weights suspended respectively on said pawl shifters and means for raising either of said weights to relieve said pawl shifters from the weight thereof.

4. In mechanism of the class described, in combination, a bracket having a plate, a pawl pivotally mounted on said plate, a ratchet wheel rotatably mounted adjacent to said pawl and coöperating therewith, pawl shifters movably mounted on said bracket and having arms engaging said pawl and adapted to move the same in opposite directions, weights having pin and slot connections with said pawl shifters, and means for moving said weights so that either of said weights may be applied while the other is inoperative.

In witness that I claim the foregoing I have hereunto subscribed my name this 3rd day of December, 1909.

ROBERT T. BURDETTE.

Witnesses:
EDMUND A. STRAUSE,
F. D. AMMEN.